(12) United States Patent
Brown, II

(10) Patent No.: US 8,016,607 B2
(45) Date of Patent: Sep. 13, 2011

(54) CONNECTOR ASSEMBLY FOR ELECTRIC VEHICLE CHARGING

(75) Inventor: Cecil Lamar Brown, II, Canton, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 12/684,620

(22) Filed: Jan. 8, 2010

(65) Prior Publication Data

US 2011/0171850 A1 Jul. 14, 2011

(51) Int. Cl.
*H01R 13/627* (2006.01)
(52) U.S. Cl. ............... 439/353; 439/34; 439/521
(58) Field of Classification Search .............. 439/519, 439/521, 34, 350, 353
See application file for complete search history.

(56) References Cited

U.S. PATENT DOCUMENTS

| | | | |
|---|---|---|---|
| D375,721 S | 11/1996 | Endo et al. | |
| 5,575,675 A | 11/1996 | Endo et al. | |
| D379,967 S | 6/1997 | Hashizawa et al. | |
| 5,664,960 A | 9/1997 | Fukushima | |
| 5,674,086 A | 10/1997 | Hashizawa et al. | |
| 5,676,560 A | 10/1997 | Endo et al. | |
| 5,751,135 A * | 5/1998 | Fukushima et al. | 320/107 |
| 5,816,643 A | 10/1998 | Itou et al. | |
| 5,873,737 A | 2/1999 | Hashizawa et al. | |
| 5,906,500 A | 5/1999 | Kakuta et al. | |
| 2011/0070758 A1 | 3/2011 | Poulin et al. | |

OTHER PUBLICATIONS

SAE International Surface Vehicle Recommended Practice, SAE Electric Vehicle and Plug in Hybrid Electric Vehicle Conductive Charge Coupler, J1772, Rev. PropDft Aug. 2006, Issued Oct. 1996, Revised Proposed Draft, Aug. 2009 Superseding J 1772 Nov. 2001.
Underwriters Laboratories Inc., Plugs, Receptacles and Couplers for Electric Vehicles—UL 2251, Feb. 28, 2002, p. 44.

* cited by examiner

*Primary Examiner* — Ross Gushi
(74) *Attorney, Agent, or Firm* — Brooks Kushman P.C.

(57) ABSTRACT

A connector assembly is provided with a housing having an inlet for receiving an electrical harness, and an outlet for engaging a vehicle receptacle for facilitating electrical charging of a vehicle. The housing includes a plurality of transverse support ribs, a fulcrum and a series of guides. The housing is configured for supporting a distributed load. A latching mechanism, including a lever, linkage and trigger, is externally connected to the housing for selectively attaching the housing to the vehicle receptacle. The lever is pivotally connected to the fulcrum. The linkage is coupled to the lever for pivoting the lever. The trigger is mounted for translation and includes a series of apertures each sized for receiving one of the guides. The trigger actuates the linkage. A shell is disposed over the housing for retaining the latching mechanism to allow repair and/or replacement without exposing electronic components enclosed in the housing.

20 Claims, 4 Drawing Sheets

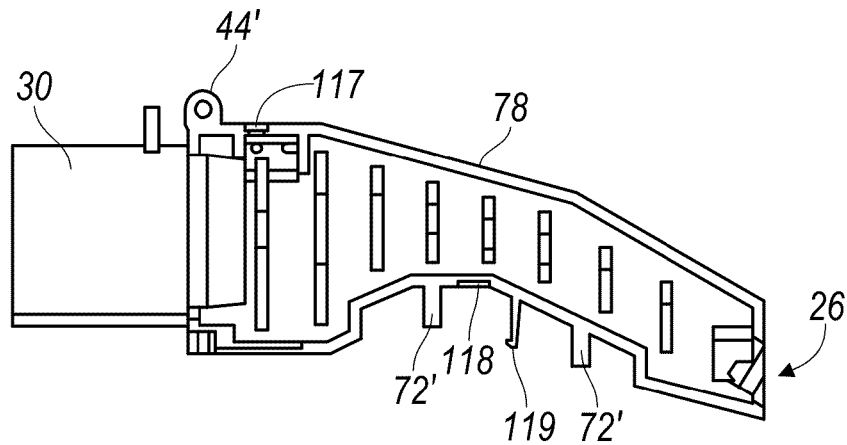 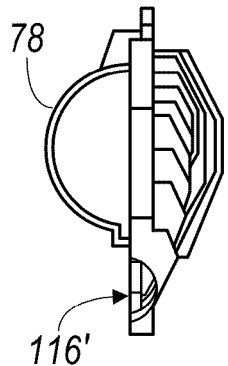
FIG. 5　　　　　　　　　FIG. 6
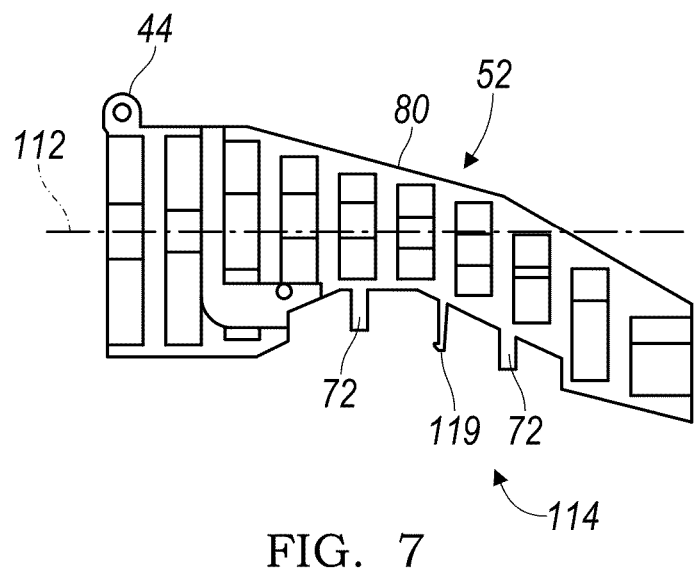 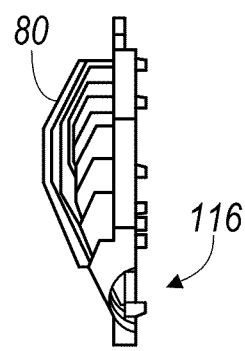
FIG. 7　　　　　　　　　FIG. 8

CONNECTOR ASSEMBLY FOR ELECTRIC VEHICLE CHARGING

BACKGROUND

1. Technical Field

One or more embodiments relate to a connector assembly for facilitating the electrical charging of a vehicle.

2. Background Art

One example of an electrical connector for electric vehicle charging is disclosed in U.S. Pat. No. 5,674,086 to Hashizawa et al. Additionally, the Society of Automotive Engineers has published SAE J1772 a specification titled "SAE Electric Vehicle and Plug In Hybrid Electric Vehicle Conductive Charge Coupler" for defining the electrical characteristics of such a connector as well as the dimensions of the interface with the vehicle.

BRIEF DESCRIPTION OF THE DRAWINGS

FIG. 5 is a side elevation view of a first housing portion of the connector assembly of FIG. 2;

FIG. 6 is a rear view of the first housing portion of FIG. 5;

FIG. 7 is a side elevation view of a second housing portion of the connector assembly of FIG. 2;

FIG. 8 is a rear view of the second housing portion of FIG. 7;

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims, and/or as a representative basis for teaching one skilled in the art to variously employ the present invention.

In general plug-in electric vehicles and plug-in hybrid electric vehicles include a receptacle so that a user may connect or "plug-in" an electrical connector assembly coupled to a power supply for charging the vehicle battery (or batteries).

Figure 1:
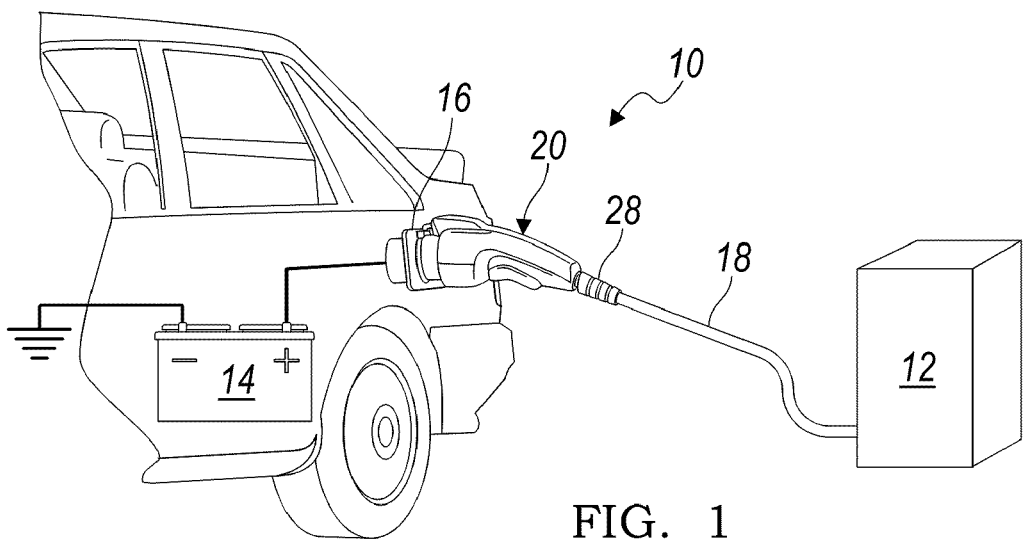
FIG. 1 is a schematic view of a vehicle charging circuit including a connector assembly for facilitating electrical charging of a vehicle according to at least one embodiment of the present invention.

With reference to FIG. 1, a charging circuit for charging an electric vehicle is illustrated in accordance with an embodiment and is generally referenced by numeral 10. The charging circuit 10 includes a power source 12 and a vehicle battery 14 that may be selectively connected to one another. A vehicle charging receptacle 16 is electrically connected to the battery 14 and mounted to be externally accessible from the vehicle. A charging cable 18 extends from the power source 12 for transferring electrical power. A connector assembly 20 is attached to an end of the charging cable 18 for connecting the power source 12 to the vehicle. The connector assembly 20 is configured for engaging the vehicle receptacle 16 for completing the charging circuit 10 and charging the battery 14. The battery 14 receives and stores electrical power for future usage by the vehicle.

Figure 2:
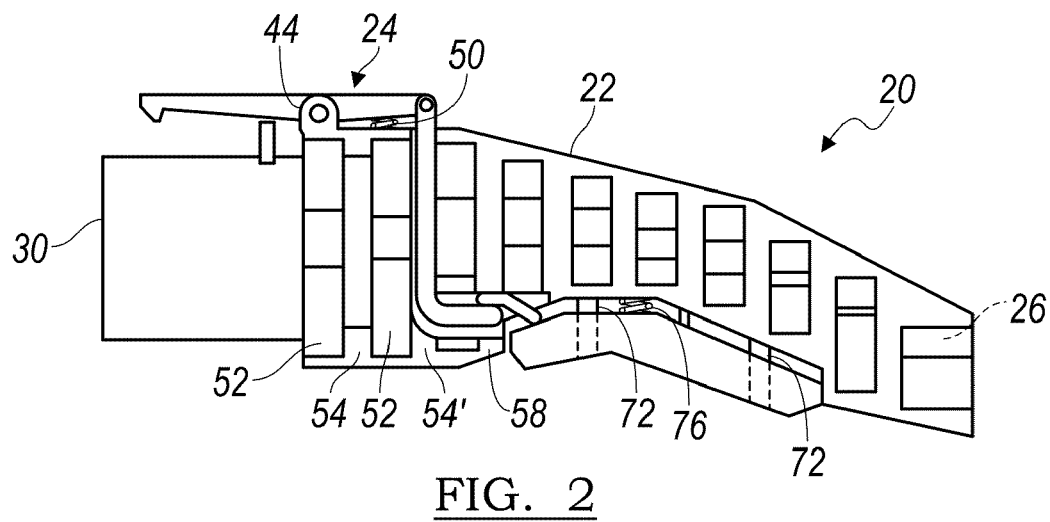
FIG. 2 is a side elevation view of the connector assembly of FIG. 1, illustrated without a shell and in a latched position according to at least one embodiment of the present invention.
Figure 3:
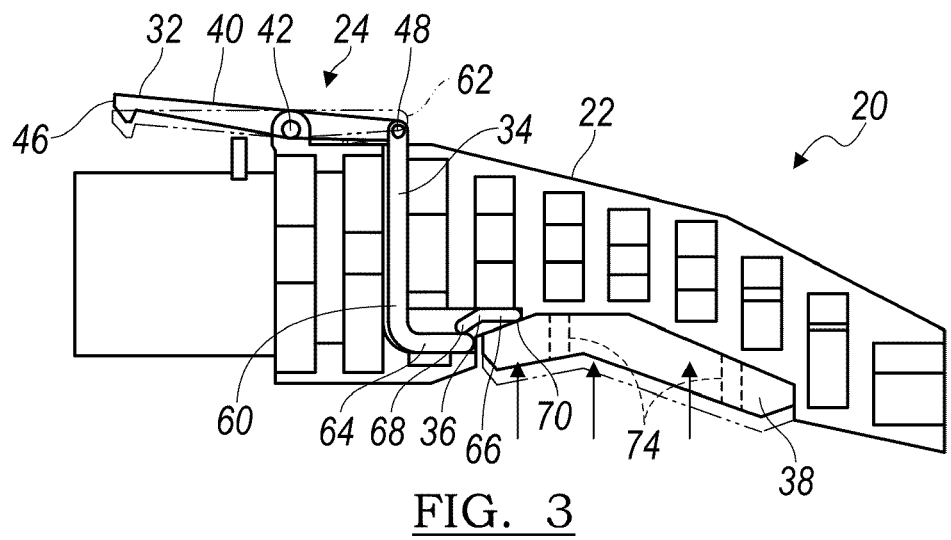
FIG. 3 is another side elevation view of the connector assembly of FIG. 2, illustrated in a released position with the latched position shown in phantom.

Referring to FIGS. 1-3, the connector assembly 20 includes an elongate housing 22 and a latching mechanism 24 connected to each other for attaching the connector assembly 20 to the vehicle. For clarity, features of the housing 22 are primarily referenced in FIG. 2, and features of the latching mechanism are primarily referenced in FIG. 3.

The latching mechanism 24 is coupled to an external portion of the housing 22. A shell is provided to retain the latching mechanism 24 to the housing 22. A driver may inadvertently drive over the connector assembly 20 if it is left lying on the ground. Therefore the housing 22 is designed to withstand such loading and protect electrical components that are enclosed by the housing 22. If a vehicle were to drive over the connector assembly 20, the latching mechanism 24 and the shell are accessible for repair and/or replacement without exposing electrical components enclosed in the housing.

The elongate housing 22 includes an inlet 26 that is sized for receiving the charging cable 18. The inlet 26 is formed at a proximal end of the connector assembly 20, away from vehicle charging receptacle 16. The charging cable 18 may include a flexible grommet 28 attached to the end of the cable 18 for providing strain relief and a seal between the charging cable 18 and the inlet 26.

The elongate housing 22 also includes an outlet 30 for engaging the vehicle charging receptacle 16 for facilitating charging of the vehicle. The outlet 30 is formed at a distal end of the housing 22. An interface between the outlet 30 and the vehicle charging receptacle 16 may be specified in an effort to standardize the connection throughout the electric vehicle industry. For example the Society of Automotive Engineers ("SAE") has specified such an interface in SAE-J1772, which is hereby incorporated by reference. However the connector assembly 20 is not limited by this SAE specification and may be utilized for applications specifying other interface requirements.

The latching mechanism 24 is externally connected to the housing 22 for selectively attaching the connector assembly 20 to the vehicle receptacle 16. FIG. 2 depicts the connector assembly 20 in a latched position. FIG. 3 depicts the connector assembly 20 in a released position with the latched position shown in phantom. The latching mechanism 24 includes a lever 32, a linkage 34, a cam 36, and a trigger 38 coupled to one another.

The lever 32 is pivotally connected to the housing 22. The lever 32 includes an elongate lever body 40 that is oriented generally radially offset from the housing 22. A lever axle 42 transversely extends from the body 34 in opposing directions. A pair of bearing supports 44 extend upward from the housing 22 and adjacent to the outlet 30. The bearing supports 44 each include an aperture for receiving the lever axle 42. The bearing supports 44 act as a fulcrum for the lever 32 to pivot about. A latch 46 extends downward from the lever body 40 toward the outlet 30. The latch 46 engages a catch (not shown) of the vehicle charging receptacle 16 for attachment. A lever post 48 transversely extends from a proximal end of the lever body 40. The linkage 34 attaches to the lever post 48 for pivoting the lever 32. A lever spring 50 is provided for biasing the lever 32 to a latched position (FIG. 2). The lever spring 50 is retained between a lever spring pocket (not shown) formed within the housing 22 and an intermediate portion of the lever body 40. The lever spring 50 may be a compression spring to provide a transverse force acting upon the intermediate portion of the lever body 40 to bias the latch 46 inward to a latched position.

The lever 32 may be formed of a unitary material, such as a polymer. For example the lever 32 may be an injection molded plastic such as Nylon 6/6 GF30 (thirty percent glass-filled). In one embodiment a lever 32 formed of Nylon and oriented in a latched position is configured for withstanding a longitudinal load exceeding 500 Newtons, that is applied to an inner surface of the latch 46 (toward the vehicle). Such loading simulates a drive away event, where a driver attempts to drive the vehicle away when the connector assembly 20 is attached. Other embodiments of the lever 32 are contemplated being formed by a cast or machined unitary metallic material. Alternatively the lever 32 may be formed as an assembly.

An array of transverse support ribs 52 extend from opposing sides of the housing 22. The support ribs 52 are arranged generally in parallel to one another along a longitudinal length of the housing 22. The support ribs 52 provide structural support for the connector assembly 20. A rib recess 54 is formed between each pair of adjacent ribs 52. A rib pocket 56 longitudinally extends from an intermediate recess 54' toward the trigger 38. A housing ledge 58 extends laterally beyond the adjacent pocket 56.

The linkage 34 is provided for pivoting the lever 24. The linkage 34 includes a linkage body 60 that is configured for translating between a pair of ribs 52 along the intermediate recess 54'. A linkage aperture 62 receives the lever post 48 to couple the linkage 34 to the lever 32. A linkage leg 64 transversely extends from the linkage body 60. The linkage leg 64 is captured within the rib pocket 56 between the housing ledge 58 and a pair of ribs 52, thereby limiting the travel of the linkage 34. Linear travel of the linkage 34 pivots the lever 32 between a release position (FIG. 3) and a latched position (FIG. 3 phantom).

The cam 36 is provided for coupling the linkage 34 to the trigger 38. The profile of the cam 36 is generally a doglegged shape. The cam 36 includes a transversely extending camshaft (not shown) that is received by the housing 22 to provide a pivotal connection. The cam 36 includes a driven portion 66 that interfaces with the trigger 38. The trigger 38 includes a ramp 70 in sliding contact with the driven portion 66. As the trigger 38 translates inward toward the housing 22, the driven portion 66 slides along the ramp 70 to pivot the cam 36 in a counter clockwise direction. The cam 36 also includes an output portion 68 that interfaces with the linkage 34. An upper surface of the linkage leg 64 is in sliding contact with the output portion 68. The linkage 34 acts as a cam follower by translating downward as the cam 36 pivots counterclockwise, from a latched position (FIG. 2) to a release position (FIG. 3). Thus, the cam 36 pivots to convert linear motion of the trigger 38 in a first direction to linear motion of the linkage 34 in a second direction, opposite that of the first direction. Other embodiments of the latching mechanism contemplate alternative mechanical components for converting the linear motion of the trigger to pivotal motion at the lever.

The trigger 38 provides a user interface for selectively actuating the linkage mechanism 24. A series of guides 72 extend downward from an intermediate portion of the housing 22. The trigger 38 includes a series of guide apertures 74 each sized for receiving one of the guides 72. The trigger 38 translates along the guides 72 (as depicted by the vertical arrows in FIG. 3), thereby pivoting the cam 36 and actuating the latch mechanism 24. A trigger spring 76 is provided for biasing the trigger 38 to a latched position (FIG. 2). The trigger spring 76 is retained between a trigger spring pocket (not shown) formed within the housing 22 and an intermediate portion of the trigger 38. The trigger spring 76 may be a compression spring to provide a transverse force acting upon the intermediate portion of the trigger to bias the trigger 38 outward to a latched position (FIG. 2).

Figure 4:
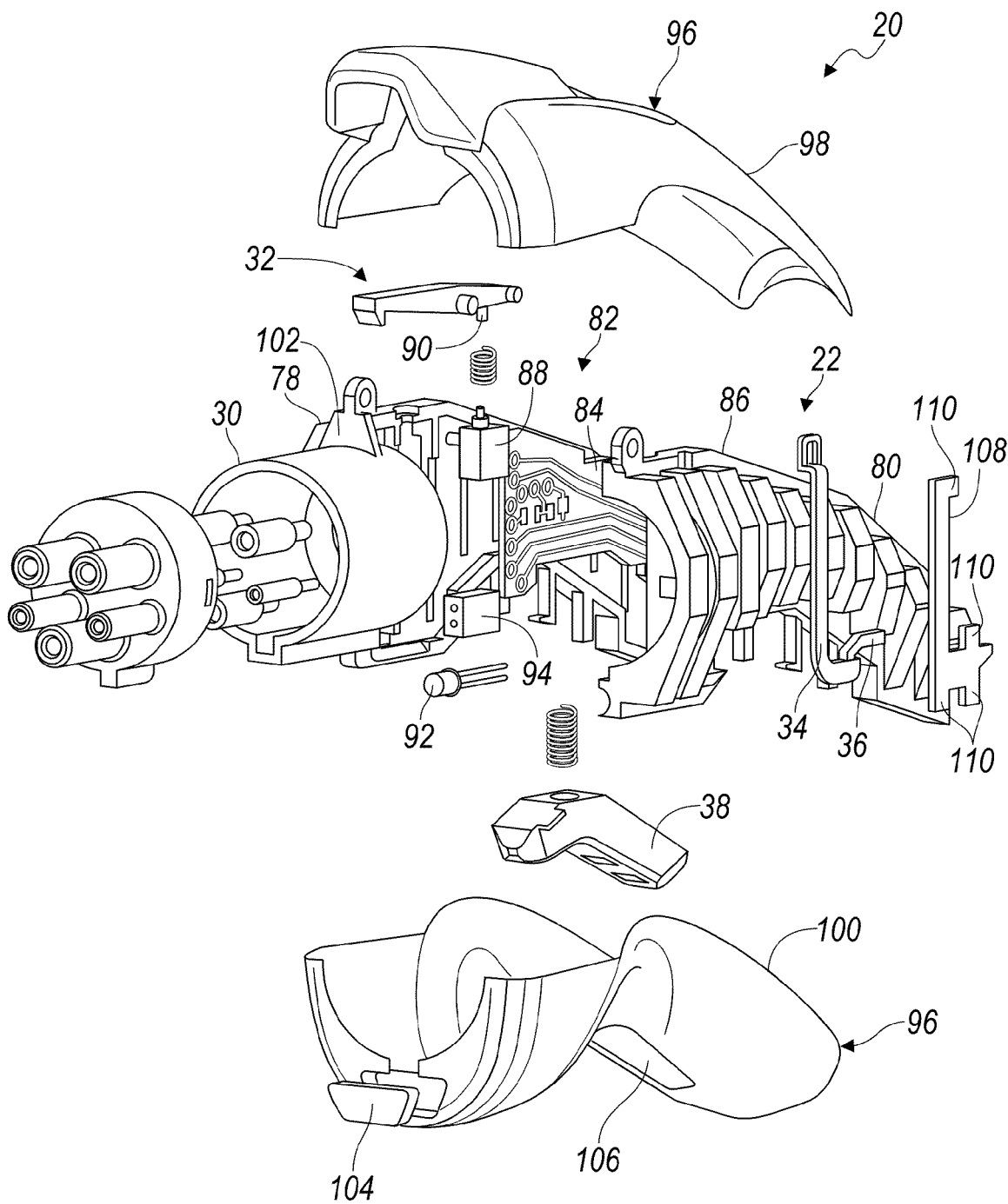
FIG. 4 is an exploded side perspective view of the connector assembly of FIG. 2.

With reference to FIG. 4, the housing 22 includes a first housing portion 78 and a second housing portion 80 connected to each other in a clamshell configuration. The first housing portion 78 includes a body 82 providing a longitudinal channel. The body 82 includes an inlet 26 (FIG. 2) for receiving the charging cable 18 (FIG. 1). The outlet 30 is generally cylindrical in shape. The electrical interface between the connector assembly 20 and the vehicle charging receptacle 16 is defined by SAE J1772. The second housing portion 80 attaches to the first housing portion 78 for enclosing and protecting electronic components within the housing 22. An adhesive (not shown) is applied around a peripheral interface 86 of the first housing portion 78 and the second housing portion 80 to provide a water tight seal. In one embodiment a macromelt sealing approach is used to seal the housing 22.

The connector assembly 20 is configured for electrically communicating with a controller (not shown) positioned within the vehicle and/or outside of the vehicle. In one embodiment of the connector assembly 20, a circuit board 84 is mounted to an intermediate portion of the body 82. The circuit board 84 may include electronic switches (e.g., transistors, FETs, etc.) for controlling the flow of electrical power through the connector assembly 20. The circuit board 84 may also include a controller (not shown) configured for controlling the switches.

The connector assembly 20 includes a position sensor 88 for providing a position signal indicative of a position of the lever 32. The position sensor 88 is in electrical communication with the circuit board 84 and enclosed within the housing 22. The position sensor 88 may be a switch or a sensor (e.g., potentiometer, encoder, hall effect sensor). In one embodiment the position sensor 88 is a basic switch activated by a lever plunger 90 that projects into the housing 22. In another embodiment the position sensor 88 is a non-contacting hall effect sensor and the lever 32 includes a magnet (not shown) for activating the sensor 88.

The connector assembly 20 includes a lamp 92 for illuminating a target connection area. A user may desire to attach the connector assembly 20 to the vehicle receptacle 16 when there is little available light. The lamp 92 assists the user by illuminating the area in front of the connector assembly 20. The lamp 92 may be a LED, and in electrical communication with the circuit board 84. The lamp 92 may be coupled to a lamp connector 94 that is coupled to the circuit board 84.

A shell 96 is disposed over the housing 22 for retaining the latching mechanism 24. The shell 96 includes an upper shell half 98 and a lower shell half 100 attached to each other to substantially enclose the housing 22 and latching mechanism 24. A locator tab 102 extends from the outlet 30 for orienting the shell 96. The lower shell half 100 includes a window for mounting a lamp lens 104. The lamp lens 104 allows light emitting from the lamp 92 to project from the connector assembly 20. The lower shell half 100 also includes a trigger slot 106 for allowing external access to the trigger 32. The longitudinal length of the trigger slot 106 is less than the length of the trigger 32 for retaining the trigger 32 within the shell 96.

The connector assembly 20 includes a linkage cover 108 for maintaining a lateral orientation of the linkage 34 and the cam 36 to the housing 22. The linkage cover 108 is formed to substantially laterally cover the linkage 34 and the cam 36 throughout their respective ranges of travel. The linkage cover 108 includes a plurality of locking tabs 110 that are received by recesses 54 adjacent the rib pocket 56 (FIG. 2) for attaching the cover 108 to the second housing portion 80.

The connector assembly 20 is designed to continue to function as intended after being driven over by a vehicle. To accomplish this functionality, the connector assembly 20 includes a contoured handle with a low profile trigger 32, and the housing includes robust transverse support ribs 52. Additionally, the shell 96 and latching mechanism 24 are externally connected to minimize repair efforts after the connector assembly 20 is driven over.

Referring to FIGS. 4-8, the connector assembly 20 is contoured to provide a low profile protected trigger 32. Some prior art connector assemblies included pivotal triggers that extended far from the housing and would likely be vulnerable to damage during a drive-over event. The transverse support ribs 52 of the first housing portion 78 and the second housing portion 80 are arched and are arranged generally in parallel. The support ribs 52 are offset from a longitudinal center 112 such that the array of ribs collectively provide a contoured handle. The contoured handle provides a trigger pocket 114. Since the trigger 32 remains in close proximity to the housing 22 and within the trigger pocket 114, the trigger 32 assumes a low profile and is protected from damage when driven over.

The housing 22 is designed to withstand vehicle loading when driven over. For example in one embodiment the housing 22 is designed to withstand a distributed load of at least 4900 Newtons. Both the first housing portion 78 and the second housing portion 80 may be molded from a polymer such as Nylon. In one embodiment each of the housing portions 78 and 80 are molded from Ultramid®, a Polyamide 6/6 (nylon), from BASF. The support ribs 52 may be formed to have a longitudinal thickness between 10 millimeters and 20 millimeters.

The shell 96 and the latching mechanism 24 are externally connected to the housing 22. Therefore the latching mechanism 24 and the shell are accessible for repair and/or replacement without exposing the enclosed electronic components (e.g., the circuit board 84).

With reference to FIGS. 5-8, the first housing portion 78 and the second housing portion 80 are substantially symmetrical about a vertical plane (not shown) and are configured to collectively form housing features. A first housing cable recess 116' and a second housing cable recess 116 laterally align to collectively form the inlet 26 for receiving the charging cable 18 (FIG. 1). The second housing bearing support 44 and a first housing bearing support 44' laterally align to receive the lever axle 42 and collectively provide a fulcrum for the lever 32 to pivot about (FIGS. 2 and 3). The second housing series of guides 72 laterally align with a first housing series of guides 72' for orienting the trigger 32 relative to the housing 22. Both housing portions 78 and 80 include a lever spring recess 117 to collectively form the lever spring pocket adjacent the bearing supports 44 and 44' for supporting the lever spring 50 (FIG. 2). Both housing portions 78 and 80 also include a trigger spring recess 118 to collectively form the trigger spring pocket adjacent the guides 72 and 72' for supporting the trigger spring 76 (FIG. 2). A first housing retaining latch 119' and a second housing retaining latch 119 laterally align for retaining the trigger 32 to the housing 22 prior to the assembly of the shell 96.

Figure 9:
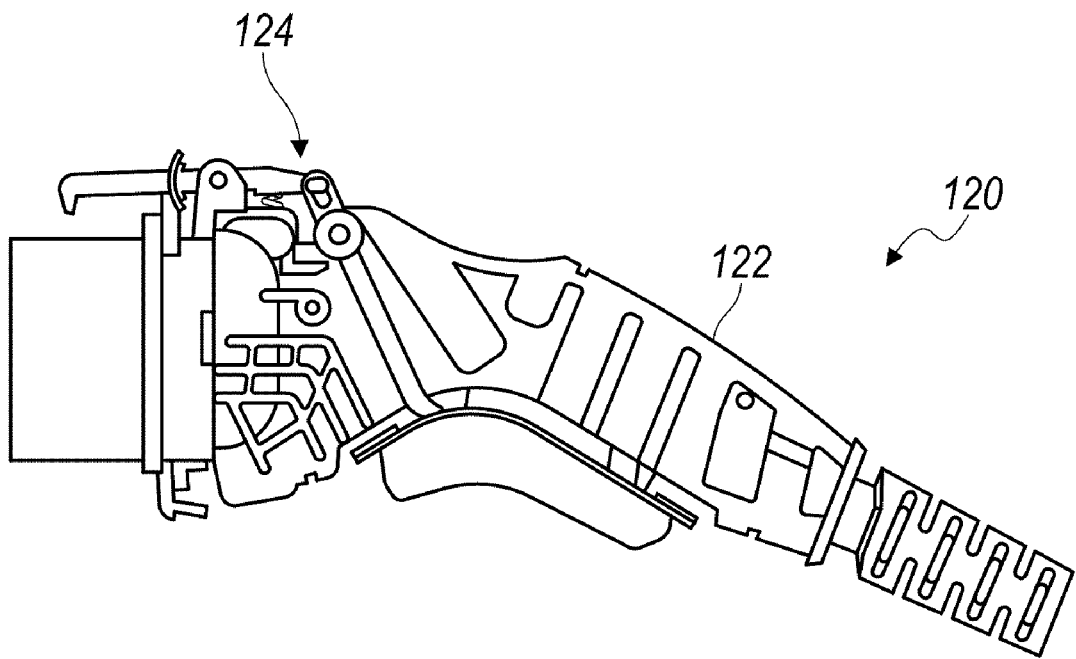
FIG. 9 is a side elevation view of the connector assembly of FIG. 1, illustrated without a shell and in a latched position according to at least one embodiment of the present invention.
Figure 10:
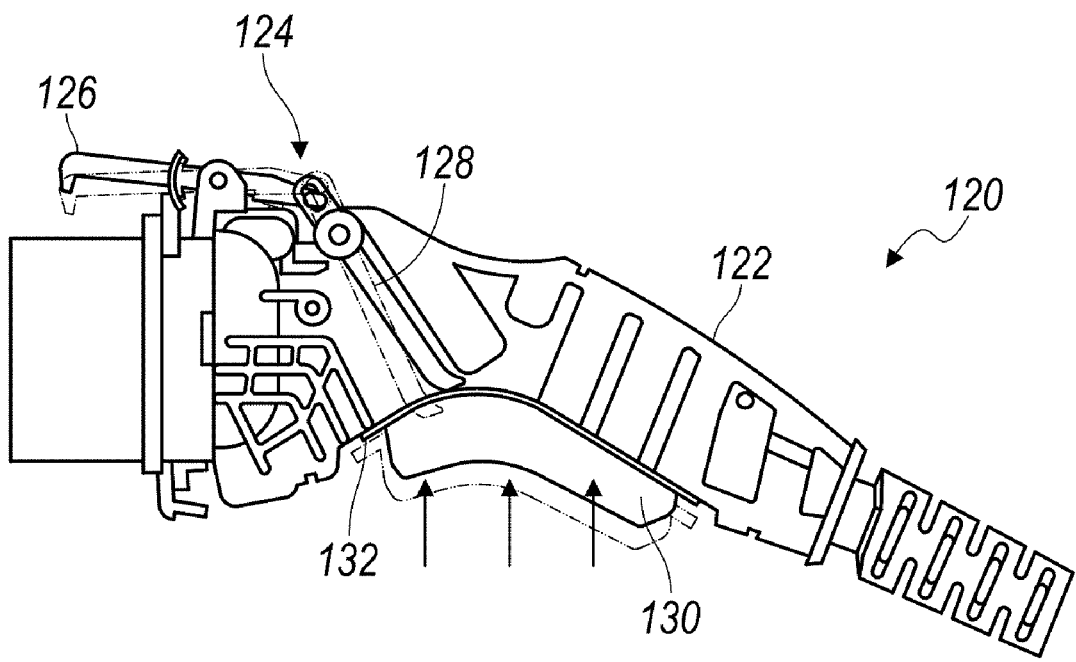
FIG. 10 is another side elevation view of the connector assembly of FIG. 9, illustrated in a released position with the latched position shown in phantom.

FIGS. 9 and 10 illustrate another embodiment of the connector assembly 120, having a pivotal linkage 128. The connector assembly 120 includes an elongate housing 122 and a latching mechanism 124 connected to each other for attachment to the vehicle. The latching mechanism 124 is externally connected to the housing 122 for selectively attaching the connector assembly 120 to the vehicle receptacle 16 (FIG. 1). FIG. 9 depicts the connector assembly 120 in a latched position. FIG. 10 depicts the connector assembly 120 in a released position with the latched position shown in phantom. The latching mechanism 124 includes a lever 126, the linkage 128, and a trigger 130 coupled to one another. The lever 126 is pivotally coupled to the housing 122. The linkage 128 is also pivotally coupled to the housing 122. The linkage 128 is coupled to the lever 126 and configured for pivoting in an opposite direction as the lever 126. A lip 132 laterally extends along an upper forward periphery of the trigger 130 for engaging the linkage 128.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A connector housing comprising:
   a first housing portion having a body providing a longitudinal channel for receiving an electrical harness, and for mounting electronic components, and for engaging a vehicle charging receptacle for facilitating an electrical charging of a vehicle;
   a second housing portion attached to the first housing portion for enclosing the electronic components and for retaining the electrical harness; and
   an array of transverse support ribs extending from opposing sides of the first housing portion and the second housing portion, the ribs being configured such that the connector housing may support a distributed load of at least 4000 Newtons.

2. The connector housing of claim 1 wherein the support ribs are formed of a Nylon material.

3. The connector housing of claim 2 wherein each of the support ribs has a thickness between 10 millimeters and 20 millimeters.

4. The connector housing of claim 1 further comprising a pocket longitudinally extending from a recess formed between adjacent ribs, the pocket sized for limiting the travel of a linkage mounted for translation along the recess.

5. The connector housing of claim 1 wherein the transverse ribs arched and are arranged generally in parallel, and at least two of the array of ribs are offset from a longitudinal center such that the array of ribs collectively provide a contoured handle.

6. The connector housing of claim 5 wherein the contoured handle forms a trigger pocket for protecting a trigger.

7. The connector housing of claim 1 further comprising a fulcrum provided on at least one of the first housing portion and the second housing portion, the fulcrum being sized for receiving a lever mounted for pivotal actuation.

8. The connector housing of claim 7 wherein at least one of the first housing portion and the second housing portion has a recess adjacent the fulcrum for receiving a first spring; and wherein the spring biases the lever to a latched position.

9. The connector housing of claim 8 wherein at least one of the first housing portion and the second housing portion has a second recess adjacent at least one of the series of guides for receiving a second spring; and wherein the second spring biases the trigger away from the connector housing to a latched position.

10. The connector housing of claim 1 further comprising:

a series of guides extending from an intermediate portion of the housing, the guides being sized for orienting a trigger mounted for translation.

11. The connector housing of claim 10 further comprising at least one retaining latch longitudinally adjacent at least one of the series of guides for retaining the trigger.

12. A connector assembly comprising:

an elongate housing forming a cavity, the housing having an inlet for receiving an electrical harness, an outlet for engaging a vehicle charging receptacle for facilitating electrical charging of a vehicle, a plurality of support ribs, a fulcrum provided on a first side of the housing and a series of guides oriented on a second side of the housing opposed from the first side;

a latching mechanism connected to the housing external of the cavity for selectively attaching the housing to the vehicle charging receptacle, the latching mechanism including:

a lever pivotally connected to the fulcrum, a linkage adjustably mounted adjacent to at least one of the support ribs and coupled to a proximal lever end for pivoting the lever, and a trigger mounted for movement relative to the housing, the trigger having a series of apertures each sized for receiving one of the guides, and the trigger being coupled to the linkage for actuating the linkage; and a shell disposed over the housing for retaining the latching mechanism.

13. The connector assembly of claim 12 wherein the linkage is mounted for translation within a recess formed between two adjacent support ribs.

14. The connector assembly of claim 12 further comprising a cam rotationally connected to the housing for coupling the trigger to the linkage, the cam being driven by the trigger to actuate the linkage to a released position.

15. The connector assembly of claim 12 wherein the linkage is pivotally connected to the housing.

16. The connector assembly of claim 15 wherein the trigger further comprises a lip laterally extending along an upper periphery for engaging the linkage.

17. The connector assembly of claim 12 further comprising a position sensor mounted within the cavity and activated by the lever for providing a position signal indicative of a position of the lever.

18. The connector assembly of claim 17 wherein the lever further comprises a plunger for projecting into the housing for activating the position sensor.

19. The connector assembly of claim 17 further comprising a magnet attached to the lever; and wherein the position sensor further comprises a non-contacting position sensor configured for activation by the magnet.

20. A connector assembly comprising:

an elongate housing having an inlet for receiving a harness, and an outlet for engaging a vehicle receptacle for facilitating charging of a vehicle;

a plurality of transverse support ribs extending from the housing;

a latching mechanism externally connected to the housing for selective attachment to the vehicle receptacle; and a shell disposed over the housing for retaining the latching mechanism such that the latching mechanism and the shell are accessible for repair and/or replacement without exposing electronic components enclosed in the housing.

* * * * *